United States Patent [19]
Tutt

[11] Patent Number: 5,093,872
[45] Date of Patent: Mar. 3, 1992

[54] ELECTRONIC IMAGE COMPRESSION METHOD AND APPARATUS USING INTERLOCKING DIGITATE GEOMETRIC SUB-AREAS TO IMPROVE THE QUALITY OF RECONSTRUCTED IMAGES

[75] Inventor: Timothy T. Tutt, Skokie, Ill.

[73] Assignee: Interand Corporation, Chicago, Ill.

[21] Appl. No.: 349,959

[22] Filed: May 2, 1989

Related U.S. Application Data

[63] Continuation of Ser. No. 118,600, Nov. 9, 1987, abandoned.

[51] Int. Cl.$^5$ .............................................. G06K 9/36
[52] U.S. Cl. .................................... 382/56; 358/261.3; 358/433
[58] Field of Search ..................... 382/56, 54, 50; 358/426, 261.1, 261.2, 261.3, 427, 432, 433, 470

[56] References Cited

U.S. PATENT DOCUMENTS

| | | | |
|---|---|---|---|
| 4,003,024 | 1/1977 | Biganati et al. | 382/4 |
| 4,222,076 | 9/1980 | Knowlton | 358/263 |
| 4,261,018 | 4/1981 | Knowlton | 358/263 |
| 4,698,691 | 10/1987 | Suzuki et al. | 358/283 |
| 4,698,778 | 10/1987 | Ito et al. | 358/283 |
| 4,742,553 | 5/1988 | Irwin | 382/27 |

Primary Examiner—David K. Moore
Assistant Examiner—Joseph Mancuso
Attorney, Agent, or Firm—Alan R. Loudermilk

[57] ABSTRACT

A method and apparatus for compressing digital image data using interlocking digitate geometric sub-areas. The digital picture elements, or PELs, representing the image are divided into interlocking digitate sub-areas, which, in the preferred embodiment, are of substantially the same size and shape. Data compression is achieved for the PELs within a sub-area by first sorting the values of the PELs within the sub-area by magnitude. Depending upon the magnitudes of the PELs in the sub-area relative to the magnitudes of the other PELs in the sub-area, the PELs in the sub-area are either coded solid tone, with each PEL in the sub-area having the same tone, or coded bi-tonal, with each PEL in the sub-area having either one of two tones. A smoothing process is utilized to reduce undesireable effects at the edges of the sub-area.

22 Claims, 4 Drawing Sheets

ELECTRONIC IMAGE COMPRESSION METHOD AND APPARATUS USING INTERLOCKING DIGITATE GEOMETRIC SUB-AREAS TO IMPROVE THE QUALITY OF RECONSTRUCTED IMAGES

This is a continuation of co-pending application Ser. No. 07/118,600 filed on Nov. 9, 1987.

BACKGROUND OF THE INVENTION

1. Field of the Invention

The present invention relates generally to the field of data compression, and more particularly to a method and apparatus for compressing video image data. The method and apparatus of the present invention compress image data such that a high degree of compression is achieved, and when an image is recreated from the compressed data the resultant image is a high quality, visually appealing representation of the original image.

2. Description of the Prior Art

Data compression is of particular economic importance in the art of image storage and transmission. Images naturally require a large amount of data. A moderate resolution monotone image, by today's standards, might consist of 640 picture elements, referred to as "PELs" per horizontal line, and 480 horizontal lines for a total of 307,200 PELs, and if each PEL of the monotone picture requires one byte of data to describe it, a total of 307,200 bytes are required to describe just one image. To place this in perspective, a double-side, double-density, five-and-one-quarter inch floppy disk could hold only a single such image. Further, at 9600 bits per second, the maximum current practical data limit for Public Switched Telephone Network ("PSTN", also "dial") lines, the time to send a single such image is 256 seconds, without overhead or retransmissions for error correction. Lack of data compression in the transmission of images forces the user to spend great amounts of time and money storing and sending and receiving images.

Many methods of compressing image data exist and are well known to those skilled in the art. Some of these methods are reversible, also called lossless, in that they reverse exactly upon decoding (decompressing) to exactly restore the original data without loss. Other methods are non-reversible. These non-reversible methods offer considerable compression. Further, as will be discussed later, they can combine with reversible methods for even more compression. But, these non-reversible methods cause loss of data. In some cases, such as eliminating excessive grey levels that are beyond the discrimination ability of the human visual system, or in doing the same for excessive color information, the picture degradation caused by the loss may only be relevant if electronic image processing is to be done. (Electronic image processing can do digital subtractions of one image from another or can intensify differences within an image and thus can make evident to the human visual system that which was invisible without processing.) But in general, the loss caused by these compression techniques is all too noticeable. There are two large groups of non-reversible compression techniques. One group reduces the data by applying transforms, such as a cosine transform, to local areas, or truncates or eliminates various of the resulting coefficients, thus reducing the data, and uses this reduced data set to perform the inverse transform for decompression. These methods are good at eliminating changes with a high spatial "frequency" and these changes generate substantial amounts of the image data. The compression ratios are good, but the ability to convey fine detail in the image is severely impaired. Also, these methods are very computation intensive, requiring heavy CPU power and/or much computation time. Another group of techniques apply variable coding techniques whereby one or more codes apply to a collection of PELs. One such prior art technique which produces substantial compression with substantial image quality degradation is block truncation coding. The image is divided into blocks, usually square (N by N PELs), and each block is analyzed to find a simple way to code it in less data than are required by PEL-by-PEL coding. The data within each block are analyzed and compressed using predetermined compression criterion. Compressed data for each block are transmitted and subsequently processed at the receiving location.

Various prior art image compression methods have attempted to maintain a high degree of image integrity by using various block shapes or smaller block sizes. Most block shapes, whether square, rectangular, or triangular, create a characteristic block border grid pattern through out the reconstructed image. The block border grid is a false contouring phenomenon caused by truncation of continuous grey level images to discrete grey level images creating abrupt changes in contrast and/or color from block to block. This characteristic is accentuated by the fact that the human eye is proficient at pattern detection. The linearity of the false contour grid pattern created in most data compression can be easily detected by one's eye and is very undesirable when viewing images.

Prior art systems of encoding data have typically encoded and transmitted each block of an image in one of three representations: 1. solid tone representation of each block, 2. bi-tonal representation of each block, or 3. all of the original image data of each block. Images are sub-divided into blocks and each block analyzed to determine which on of the three representations above best describes each block of the image. Based on decision criteria, if a block is substantially solid, the block is encoded entirely as a solid, all PELs in the block being assigned a single value representing the PEL "average". If the block is substantially bi-tonal, the block is encoded in two tones (or values) and includes a block bit map. The block bit map consists of one bit per PEL of the block and tells the decoder which of the two values (or tones) should be assigned to each PEL. If the block fails to qualify as either solid or bi-tonal, then all of the data for the block is transmitted, PEL-by-PEL, a very data and therefore storage space and time intensive process.

Additionally, most block coding compression methods compress each block of data independent of the surrounding blocks. By independently compressing each image block the false contour grid pattern is further enhanced. For example, it is common that when an image block is compressed without regard for its nearest neighbors a continuous gradient that existed across the span of blocks prior to compression becomes a series of discrete levels with an abrupt step at each border. Truncation of continuous contrast areas results in enhancing the false contrast grid pattern.

Prior art image compression systems have tried to reduce the obviousness of the characteristic grid by applying "smoothing" processes. These processes adjust the PEL values to reduce the sharp edge effects where the blocks meet. In an attempt to refine the block smoothing process many complex smoothing methods have been developed. While many of these smoothing, processes do a fair job of smoothing they are burdened with time intensive computations and often do so much adjusting that they result in images which appear fuzzy. Even though these techniques have helped to reduce the obviousness of the false contrast grid pattern, in many images the pattern is still obvious. Further, the typical smoothing process degrades a compressed image by smoothing high contrast image borders such that image borders are no longer distinct and appear to be out of focus or fuzzy in the reconstructed image. Fine detail is lost, just as was the case in the use of transforms.

In contrast, the present invention overcomes the foregoing limitations providing a block-style method which minimizes image degradation, yet provides substantial compression.

It has been discovered that the characteristic block grid can be reduced by using sub-areas with certain specific properties. The sub-area must be small in order to minimize the block effects referred to earlier. While this might appear to reduce compression, since for example, the compression gain on a solid type block is directly equal to the number of PELS in the block, in fact the selection of a small block can increase compression, because as the blocks grow larger, more and more blocks must be coded as bi-tonal, wherein compression is reduced by a factor of two-to-three from solid block compression, or even worse PEL-by-PEL, wherein compression is worse than unity.

The sub-areas should be maximally compact. For a situation where images are roughly statistically isotropic (have no preferred directions as far as image detail is concerned) and the PELs are square (have equal spacing center-to-center in horizontal and vertical directions), then the preferred shape is a circle. Since image PEL-to-PEL correlation statistically increases (for typical images containing visual information from a human perspective) as PEL-to-PEL distance decreases, a round sub-area offers the highest possible PEL-to-PEL correlations on a statistical basis, thus the best chance of achieving maximum compression with minimum image degradation.

The sub-areas should completely tile the image area. Otherwise, some PELs will be left out of the collection of all sub-areas. Either the data of these PELs will be lost, leaving "holes" in the image, or they will have to be handled on a special basis. If there were any significant quantity of such PELs, the special handling would decrease the effective compression.

The sub-areas should tile in such a way that linear inter-sub-area borders of any significant length are minimized or eliminated. In other words the sub-areas should interlock to create non-linear boundaries. The interlocking geometric areas minimize the linear artifact common to prior art block compression methods as pattern seen in the reconstructed image, resulting in a visually more appealing image.

It has further been discovered that at least one specific shape and size of sub-area applied to a specific size and shape image PEL array is so effective that high quality images can be provided using only two of the three common modes of coding blocks: solid tone, and bi-tone. This eliminates the data intensive PEL-by-PEL coding further aiding compression.

It has also been discovered that this sub-area lends itself to simple smoothing method which only minimally alters apparent edge and detail sharpness, and further which requires only minimal computation.

Also, a method of deriving indices for solid tone and bi-tone blocks which is much less computation intensive has been discovered.

Accordingly it is an object of the present invention to provide the methodology and apparatus to compress image data such that the image is compressed using interlocking geometric subareas of the original image which results in greater visual appeal of the reconstructed image.

A further object of the present invention is division of the image area into sub-areas such that an image may be encoded using two block representations instead of three representations as is commonly used in the prior art. The two representations used are solid and bi-tonal, thereby eliminating the need for the extremely time intensive transmission of all of the data within a block.

Another object of the present invention is a simple, non-calculation-intensive method of smoothing the boundaries where the interlocking geometric areas meet in a reconstructed image, thus further improving the image appearance.

Yet another object of the present invention is a method of developing the sub-area indices which is non-calculation-intensive, yet also yields superior representation.

SUMMARY OF THE INVENTION

The present invention tiles the image area with sub-areas which include all PELs and are very compact, coming very close to an ideal round shape. These sub-areas are small, increasing their internal statistical correlation and improving their ability to represent their constituent pels. They interlock to break u the linear grid patterns typical of block systems. In particular, a preferred embodiment uses a sub-area which is twofold, mirror symmetric, contains 12 PELs in its smallest form, and has a general cross shape. This sub-area fully tiles a square or rectangular image area, filling all PEL space (i.e., including all PELs.) The mean distance from the center of the sub-area to the centers of the 12 PELs is at a minimum for any twelve PEL sub-area and also for sub-areas having a similar number of PELs.

The present invention qualifies these sub-areas for solid tone or bi-tone coding and finds the representative indices for the preferred coding with a minimum of computation. This coding type decision process has been improved by using reference to near neighbors. The need for PEL-by-PEL coding of some blocks has been eliminated. This is accomplished by sorting the PELs into an ordered array by magnitude. Tests are then performed on this array to determine the type of coding to be used and the values to be assigned to the code indices. These tests are combined with near neighbor comparisons to aid in the type of coding decisions.

The present invention smoothes the sub-area boundary edges with a non-calculation-intensive smoothing method.

DETAILED DESCRIPTION OF THE PREFERRED EMBODIMENT

Figure 1A:
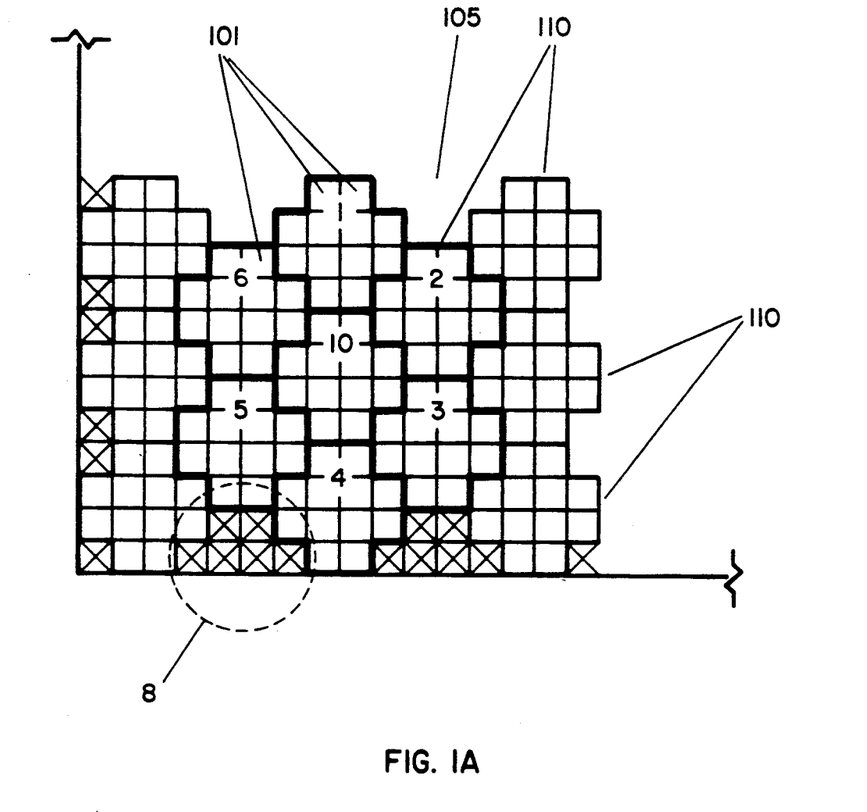
FIG. 1 is a drawing of the preferred embodiment of the sub-area shape used in the method of the present invention.
Figure 1B:
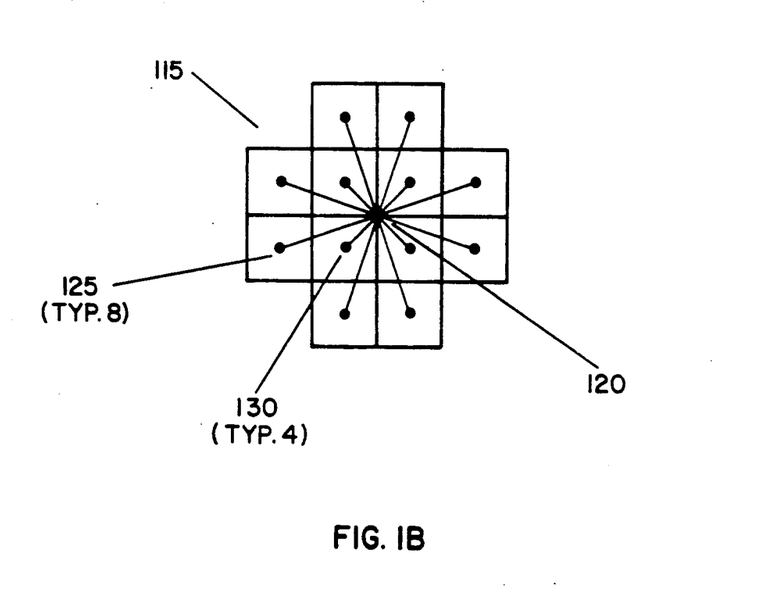

The preferred embodiment of the present inventions subdividing method is shown in FIG. 1. As shown in FIG. 1, sub-area 1, the preferred embodiment of the present invention employs a sub-area cross-like shape composed of twelve (12) pels. The shape of the geometric sub-area shown in FIG. 1 is significant because of its characteristic interlocking digitate shape. While some combinations of two (2) to eleven (11) pels create geometric areas which digitate or interlock or both, all of the combinations create extensive linear boundaries resulting in a grid pattern which is characteristic of block compression systems. Twelve pels in a cross shape is the minimum number of pels required to create an interlocking digitate geometric area which does not create extensive linear boundaries. Extensive linear boundaries in a pattern are best visualized as a grid pattern created by an array in which its elemental blocks do not interlock.

The human eye is especially proficient at identifying linear patterns and boundaries. Therefore, it is important to break up extensive linear boundaries. In the preferred embodiment of the present invention linear boundaries are eliminated by interlocking the sub-area array. This can be seen by trying to find a straight line (linear) border path caused by the boundary edges of the sub-areas of FIG. 1.

It can be seen from FIG. 1 that all of PELS 101 belonging to image are 105 area indeed located in one or another of sub-areas 110. The compactness is demonstrated by single sub-area 115 which shows 12 radial vectors connecting sub-area center 120 with PEL centers 125. Four of these vectors 130 can be computed by simple trigonometry to be the-square-root-of-two divided by two times the inter-PEL distance, which is equal in both vertical and horizontal directions in the preferred embodiment. (Note however, that this invention and this preferred sub-area shape can both be applied to non-square PELs.) The remaining eight vectors can by similar math be shown to have a length of square-root-of-2.25 times the inter-PEL distance. The mean radius can be computed to be only 1.289 times the inter-PEL distance.

Approximating a circular area using the fewest number of pels provides the greatest probability of correlation between the pels within the area's border and provides the greatest number of nearest neighbors. The twelve (12) pel cross 10 has six (6) nearest neighbors 1-6, which greatly improves the end result of the image after it is processed using a smoothing system.

The intensity values of the pels in the sub-area are sorted in an array according to magnitude. The minimum and maximum value of the array, "low extreme" (LE) and "high extreme" (HE) are compared. If the maximum and minimum values (LE and HE) differ by less than a small constant value, the sub-area can be assigned a solid-tone without further calculation. This solid block can be assigned the value obtained by taking the mean of its extreme values. Thus this first decision forms the value HE - LE which we will call the "difference of the extremes" (DOE). DOE is compared to a small constant value we will call "solid tone constant one" (STC1), and if DOE is equal or less than STC1, the sub-area will be encoded solid and given value maximum plus minimum quantity divided by two, which we will call the "mean of the extremes" (MOE). Thus MOE equals (HE+LE) / 2. (Note that so far, for each sub-area, we have done a sort, a single difference calculation between two values followed by a comparison with a constant, and a two value sum divided by two, an operation which can be done with a shift and does not require actual division.)

Otherwise, having failed the above solid tone first test, the sorted array is further tested. This is done by using the MOE to divide the array into a upper value population and a lower value population, based on whether each array value is respectively greater than or less than the MOE. This requires up to ten comparisons. (The extreme values must lie in their respective array segments.) Next, we find the value of the median PEL of each array segment (upper and lower medians). We will refer to these as the "upper median value" (UMV) and the "lower median value" (LMV). Since there are only 12 total values, representing the 12 total PELs in the array, a segment can contain from 1 to 11 PELs, thus 1 to 11 values. If there are an even number of PELs in the segment, then there is no true median PEL. The PEL nearest the center of the segment, but toward the respective extreme of that center is used as the median PEL. Thus if the array splits 4 PELS having values below the MOE and eight PELs having values above the MOE, the UMV will be the value of the fourth PEL from the high extreme end and the LMV will be the value of the PE second from the low extreme end. There will be 6 pels in between the LM PEL and the HM PEL.

Figure 3:
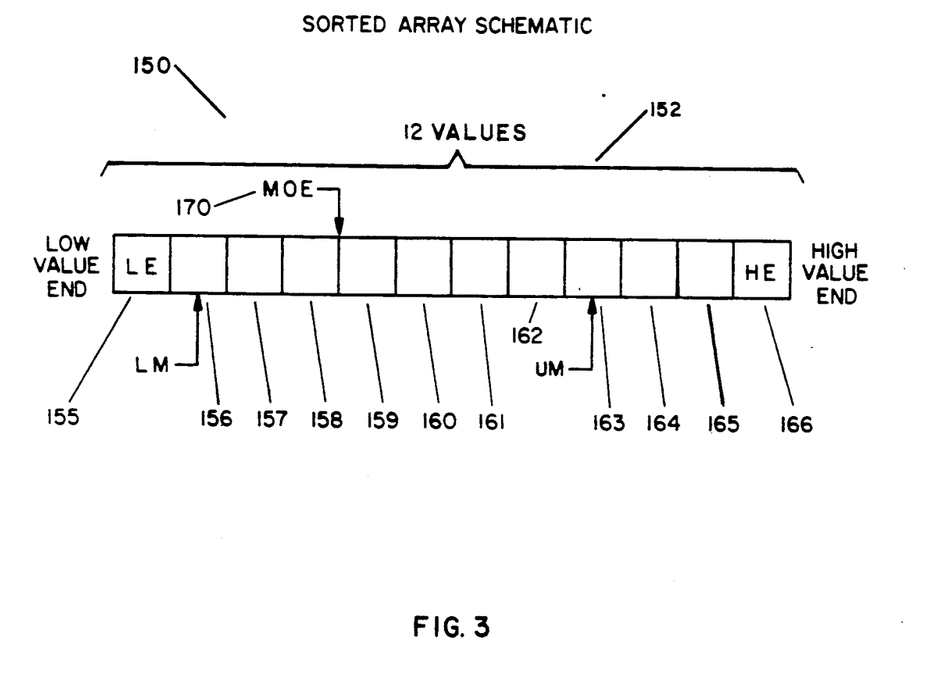
FIG. 3 is a schematic of a sorted array of sub-area PEL values.

This can be more fully understood by referring to FIG. 3, a sorted array schematic. Sorted array 150 has twelve values 152 sorted left-to-right from low extreme (LE) 155 to high extreme (HE) 166. The twelve PEL values are designated 155 through 166. MOE 170 is shown falling in between the values of 158 and 159 splitting the array into lower segment 155-158 and upper segment 159-166. Lower median PEL is thus 156, just below the center of its segment, and its value is the LMV. Upper median PEL UM is 163 just above the center of its segment and its value is the UMV.

Now the next test can be applied. If the difference between the UMV and the LMV, called the "difference of medians" (DOM) is less than or equal to a specified constant, called the "solid tone constant two" (STC2), the sub-area is typed and encoded as a solid tone sub-area. Again, the solid tone sub-area will be assigned the value of the MOE. An alternate embodiment assigns the coding for this case to be the mean of the medians, (HMV+LMV) / 2, (MOM). This alternate seems to have some advantages for certain image types. An embodiment might use both types selecting according to image classification. If the DOM is greater than constant STC2, than the array is considered too disperse for solid tone coding, and it will be bi-tone coded. The lower index will be the LMV and the upper index the UMV. A string of twelve bits will show whether each PEL belongs to the lower array segment population (bit assigned value 0) or the upper array segment population (bit assigned value 1).

The entire coding process has been accomplished without multiplication or division (divide by 2 being not a true division in a binary system, but rather a rapidly achieved one bit shift). This is most important for fast transmission as a method requiring extensive multiplication and division would require a calculation time exceeding the transmission time, and the calculation time would rapidly become the limiting factor.

One extra bit per sub-area is required, indicating whether the sub-area has been coded solid or bi-tone.

The decision to code solid or bi-tone is a very important factor in image compression and quality. This decision is enhanced in the preferred embodiment by consulting the value of the neighboring PELs. These values can be used to better decide whether an image boundary is running through the sub-area, in which case bi-tone is indicated. If there is such an edge or boundary feature running through the sub-area, then we can expect the neighboring PELs to agree closely with one of the two median values, the LMV or the HMV. Otherwise, it is likely that the surrounding area is simply disperse (noisy or grainy or sloping in value) and a decision to solid tone code is indicated.

The preferred embodiment of the present invention is suitable for use in conjunction with the method described in copending patent application, U.S. Pat. App. Ser. No. filed Nov. 9, 1987 by Tutt "Statistical Difference Coding as an Image Data Compression Method", which is hereby incorporated by reference.

Figure 2:
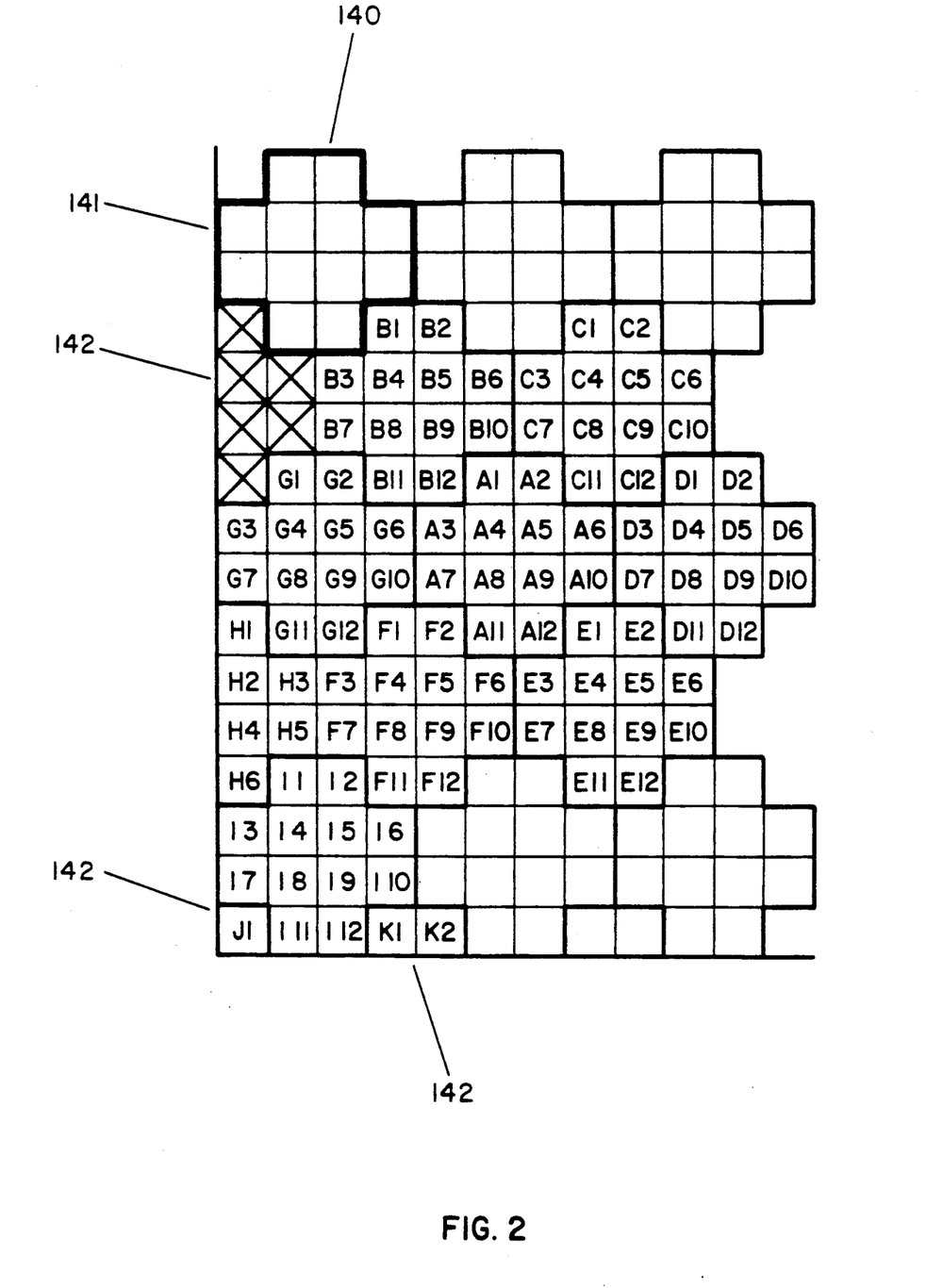
FIG. 2 is a drawing of pel locations within the subareas of the preferred embodiment of the present invention.

FIG. 2 shows a partial array of sub-areas 140. At border 141 there will be incomplete sub-areas 142. These can be handled in any of several ways: filled black, filled white, filled with the nearest neighbor values, or handled as special sub-areas, or as PEL-by-PEL. In the preferred embodiment, since these are few in number, occur at the screen edge where viewing is poor anyway, and often disappear completely due to monitor overscan, they are filled black which requires minimum time and data.

Upon reconstruction of the image, when it is retrieved from storage or received after transmission, the PEL values will be altered from their original values due to the coding process which cannot be fully reversed. For example, all PELs of a solid tone sub-area will now be identical, equal to the MOE, where initially there may have had a range.

To reduce unpleasant edge effects due to this distortion of values, every border PEL is smoothed by averaging with true neighbors. FIG. 2 shows border PEL A1 with true neighbors (PELs located horizontally or vertically touching in a neighboring sub-area) B10 and B12. The smoothing formula is two times A1 plus B10 plus B12, quantity divided by 4. This becomes the new A1 value A1'. Thus, in equation form:

$$A1' = ((2 * A1) + B10 + B12) / 4$$

Again neither true multiplication nor true division is required, only two bits of shift being required for the "divide" by 4.

Figure 4:
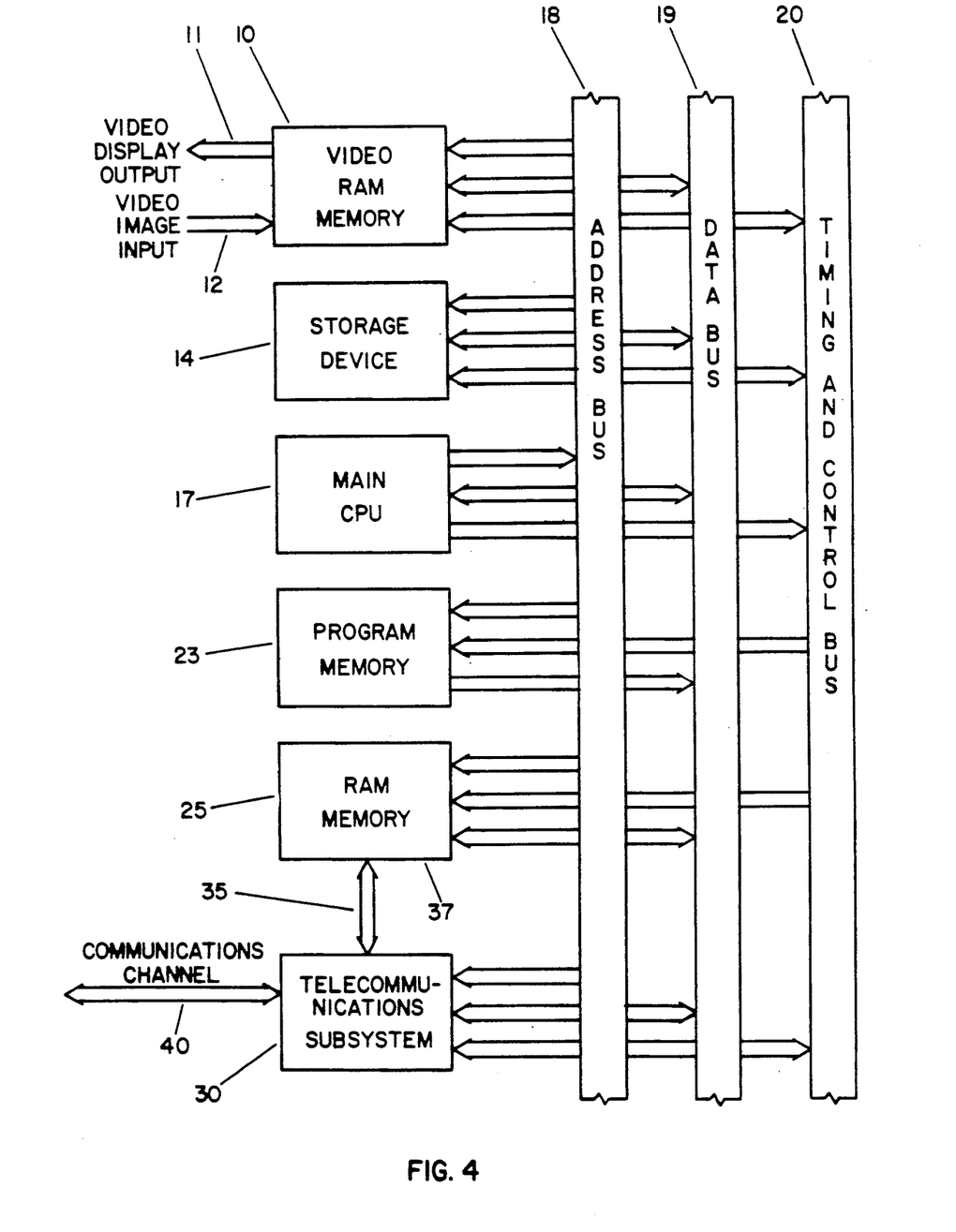
FIG. 4 is a block diagram of the apparatus of the present invention.

FIG. 4 is a block diagram of a preferred hardware embodiment of the present invention. Video RAM memory 10 stores the image to be compressed or decompressed and has output port 11 providing a video image in form suitable for display on a monitor and input port 12 capable of accepting and storing a video image from a source such as a video camera, a video image generator, or other video output source. In the preferred embodiment, the signal requirements for 10 and 11 conform to RS-170 for non-color and RS-170A for color, or an RS-170A variant wherein the color is in RGB or IYQ form as opposed to NTSC color carrier encoding. Other color encodings or video formats can clearly be accommodated and lie within the scope and spirit of the invention. Storage device 14, in the preferred embodiment an NEC 8647HY001 D4126C-12 64K RAM manufactured by NEC Electronics, 401 Ellis Street, Mountain View, CA 94043, and more generally any digital storage device appropriate to image data storage, Storage Device 14 will operate under the control of Main CPU 17, via Address Bus 18, Data Bus 19, and Timing and Control Lines 20. These same Buses and Lines extend to the Video Ram Memory and to the other blocks mentioned below, allowing the CPU to control the entire system, and the parts of the system to inter-communicate. Program Memory 23 can be alternately a ROM memory to hold the CPU program or a combination of a boot ROM and a RAM memory which will be downloaded with the program from Storage Device 14. RAM Memory 25 serves as data memory for the Main CPU, storage for the various intermediate values and tables required by the coding and decoding processes, and data buffers for the data files to be stored or transmitted and being retrieved or received. Telecommunications subsystem 30 interfaces RAM Memory 25 either through a dedicated bus 35, as shown, or through sharing the Buses and Lines 18, 19, and 20. In the former case, using Bus 35, RAM Memory 25 must have second port 37 (i.e., be dual ported RAM). Telecommunications subsystem 30 supports communications channel 40, which in the preferred embodiment consists of one or more Public Switched Telephone Network (PSTN) lines, also known generally as "dial phone lines". Alternate embodiments can utilize private leased lines, high speed digital lines such as ISDN network lines, etc.

An alternative embodiment of the present invention uses larger interlocking digitate geometric areas than the cross 10 shown in FIG. 1. Any shape with overall dimensions of 4n×4n, and digits that are n long by 2n wide, where n is an integer number of PELs greater than 0, will form a scaled version of the preferred embodiment. However, the quality of the image may degrade with increased size depending on the compression method used and the contrast variation and border details of the subject image.

Although the preferred embodiment of this invention is used with a grey scale system it will be obvious to one skilled in the art that an alternative embodiment could be implemented using a tri-color system. For example in a YIQ system, one luminance signal (Y) and two chrominance signals (I and Q), the same encoding is used to encode each plane of the video random access memory (VRAM). The method of the present invention is carried out on each plane, Y, I and Q, such that each plane is divided into corresponding geometric digitate sub-areas and compressed independently of the other plane. On the receiving end of the transmission the planes are processed to reconstruct the original image in the original colors.

Additionally, it will be obvious to one skilled in the art that the above discussed color system is applicable to any other tri-color systems such as LAB, HSV, and RGB.

Although the invention has been described in terms of a preferred embodiment and alternative embodiments, it will be obvious to those skilled in the art that many alterations and modifications may be made without substantially departing from the spirit of the invention. Accordingly, it is intended that all such alterations and modifications be included in the spirit and scope of the invention as defined by the appended claims.

We claim:

1. In an image processing system wherein images are represented by grey scale image data consisting of a collection of digital picture elements, a method of compressing the image data comprising the steps of:
dividing the image data into interlocking subareas containing a plurality of picture elements, wherein the interlocking subareas are of substantially uniform size and shape and interlock with each adjacent subarea; and
coding each of the picture elements of each interlocking subarea with a digital value, where the coding comprises sorting the values of the picture elements in each subarea, and wherein the digital value coded for a particular picture element is dependent upon the magnitudes of the picture elements of the interlocking subarea containing the particular picture element.

2. The method as claimed in claim 1 where the step of sorting comprises sorting the values of the picture elements contained in each interlocking subarea into an array ordered by relative magnitude of the picture elements within the interlocking subarea, wherein the digital value coded for a particular picture element is dependent upon the magnitudes of the values of the picture elements in the array.

3. The method as claimed in claim 1 further comprising the step of modifying one or more of the digital values coded for the picture elements contained within one or more of the interlocking subareas, wherein the value of a particular modified digital value for a picture element contained within a particular interlocking subarea is dependent upon the coded digital values of the picture elements within one or more of the interlocking subareas in proximity to the particular interlocking subarea.

4. The method as claimed in claim 3 wherein the modified digital values coded for the picture elements contained within one or more of the interlocking subareas are equal to the sum of two times the assigned value of the picture element plus the values of two picture elements within one or more of the interlocking subareas in proximity to the particular interlocking subarea, divided by four.

5. The method as claimed in claim 1 wherein the interlocking subareas are substantially in the shape of a cross.

6. The method as claimed in claim 1 wherein substantially all of the interlocking subareas contain twelve picture elements.

7. The method as claimed in claim 1 wherein the interlocking subareas are substantially in the shape of a cross and wherein substantially all of the interlocking subareas contain twelve picture elements.

8. The method as claimed in claim 1 wherein the step of coding each of the picture elements of each interlocking subarea with a digital value comprises the steps of:
sorting the values of the picture elements contained in each interlocking subarea into an array ordered by relative magnitude of the picture elements within the interlocking subarea;
determining the minimum value of the picture elements in the ordered array for each interlocking subarea;
determining the maximum value of the picture elements in the ordered array for each interlocking subarea;
comparing the difference between the maximum value and minimum value of the picture elements in the ordered array to a first predetermined constant value;
coding each picture element within the interlocking subarea with the same digital value for each interlocking subarea in which the difference between the maximum value and minimum value of the picture elements in the ordered array is less than or equal to the first predetermined constant value;
performing the following steps for each interlocking subarea in which the difference between the maximum value and minimum value of the picture elements in the ordered array is greater than the first predetermined constant value;
determining the mean of the maximum value and the minimum value of the picture elements in the ordered array;
sorting the values of the picture elements in the ordered array into an upper array segment and a lower array segment, wherein the values of the picture elements in the upper array segment are greater than or equal to the mean of the maximum value and the minimum value of the picture elements in the ordered array and the values of the picture elements in the lower array segment are less than the mean of the maximum value and the minimum value of the picture elements in the ordered array;
determining the median value of the values in the upper array segment and the median value of the values in the lower array segment;
comparing the difference between the median value of the values in the upper array segment and the median value of the values in the lower array segment to a second predetermined constant value;
coding each picture element within the interlocking subarea with the same digital value for each interlocking subarea in which the diffference between the median value of the values in the upper array segment and the median value of the values in the lower array segment is less than or equal to the second predetermined constant value; and
coding each picture element within the interlocking subarea with one of two digital values for each interlocking subarea in which the difference between the median value of the values in the upper array segment and the median value of the values in the lower array segment is greater than the second predetermined constant value.

9. In an image processing system wherein images are represented by grey scale image data consisting of a collection of digital picture elements, an apparatus for compressing the image data, comprising:
means for dividing the image data into interlocking subareas containing a plurality of picture elements, wherein the interlocking subareas are of substantially uniform size and shape and interlock with each adjacent subarea; and means for coding each of the picture elements of each interlocking subarea with a digital value, where the coding means comprises sorting means for sorting the values of the picture elements in each subarea, and wherein the digital value coded for a particular picture element is dependent upon the magnitudes of the picture elements of the interlocking subarea containing the particular picture element.

10. The apparatus as claimed in claim 9 where the means for sorting comprises sorting means for sorting the values of the picture elements contained in each interlocking subarea into an array ordered by relative magnitude of the picture elements within the interlocking subarea, wherein the digital value coded for a particular picture element is dependent upon the magnitudes of the values of the picture elements in the array.

11. The apparatus as claimed in claim 9 further comprising means for modifying one or more of the digital values coded for the picture elements contained within one or more of the interlocking subareas, wherein the value of a particular modified digital value for a picture element contained within a particular interlocking subarea is dependent upon the coded digital values of the picture elements within one or more of the interlocking subareas in proximity to the particular interlocking subarea.

12. The apparatus as claimed in claim 11 wherein the modified digital values coded for the picture elements contained within one or more of the interlocking subareas are equal to the sum of two times the assigned value of the picture element plus the values of two picture elements within one or more of the interlocking subareas in proximity to the particular interlocking subarea, divided by four.

13. The apparatus as claimed in claim 9 wherein the interlocking subareas are substantially in the shape of a cross.

14. The apparatus as claimed in claim 9 wherein substantially all of the interlocking subareas contain twelve picture elements.

15. The apparatus as claimed in claim 9 wherein the interlocking subareas are substantially in the shape of a cross and wherein substantially all of the interlocking subareas contain twelve picture elements.

16. The apparatus of claim 9 wherein the means for coding each of the picture elements of each interlocking subarea with a digital value comprises:

means for sorting the values of the picture elements contained in each interlocking subarea into an array ordered by relative magnitude of the picture elements within the interlocking subarea;

means for determining the minimum value of the picture elements in the ordered array for each interlocking subarea;

means for determining the maximum value of the picture elements in the ordered array for each interlocking subarea;

means for comparing the difference between the maximum value and minimum value of the picture elements in the ordered array to a first predetermined constant value;

means for coding each picture element within the interlocking subarea with the same digital value for each interlocking subarea in which the difference between the maximum value and minimum value of the picture elements in the ordered array is less than or equal to the first predetermined constant value;

means for determining the mean of the maximum value and the minimum value of the picture elements in the ordered array;

means for sorting the values of the picture elements in the ordered array into an upper array segment and a lower array segment, wherein the values of the picture elements in the upper array segment are greater than or equal to the mean of the maximum value and the minimum value of the picture elements in the ordered array and the values of the picture elements in the lower array segment are less than the mean of the maximum value and the minimum value of the picture elements in the ordered array;

means for determining the median value of the values in the upper array segment and the median value of the values in the lower array segment;

means for comparing the difference between the median value of the values in the upper array segment and the median value of the values in the lower array segment to a second predetermined constant value;

means for coding each picture element within the interlocking subarea with the same digital value for each interlocking subarea in which the difference between the median value of the values in the upper array segment and the median value of the values in the lower array segment is less than or equal to the second predetermined constant value; and means for coding each picture element within the interlocking subarea with one of two digital values for each interlocking subarea in which the difference between the median value of the values in the upper array segment and the median value of the values in the lower array segment is greater than the second predetermined constant value.

17. In an image processing system wherein images are represented by image data consisting of a collection of digital picture elements, a method of compressing the image data comprising the steps of:

dividing the image data into interlocking subareas containing a plurality of picture elements, wherein the interlocking subareas are of substantially uniform size and shape;

sorting the values of the picture elements contained in each interlocking subarea into an array ordered by relative magnitude of the picture elements within the interlocking subarea;

determining the minimum value of the picture elements in the ordered array for each interlocking subarea;

determining the maximum value of the picture elements in the ordered array for each interlocking subarea;

comparing the difference between the maximum value and minimum value of the picture elements in the ordered array to a first predetermined constant value;

coding each picture element within the interlocking subarea with the same digital value for each interlocking subarea in which the difference between the maximum value and minimum value of the picture elements in the ordered array is less than or equal to the first predetermined constant value;

performing the following steps for each interlocking subarea in which the difference between the maximum value and minimum value of the picture elements in the ordered array is greater than the first predetermined constant value;

determining the mean of the maximum value and the minimum value of the picture elements in the ordered array;

sorting the values of the picture elements in the ordered array into an upper array segment and a lower array segment, wherein the values of the picture elements in the upper array segment are greater than or equal to the mean of the maximum value and the minimum value of the picture elements in the ordered array and the values of the picture elements in the lower array segment are less than the mean of the maximum value and the minimum value of the picture elements in the ordered array;

determining the median value of the values in the upper array segment and the median value of the values in the lower array segment;

comparing the difference between the median value of the values in the upper array segment and the median value of the values in the lower array segment to a second predetermined constant value;

coding each picture element within the interlocking subarea with the same digital value for each interlocking subarea in which the difference between the median value of the values in the upper array segment and the median value of the values in the lower array segment is less than or equal to the second predetermined constant value; and coding each picture element within the interlocking subarea with one of two digital values for each interlocking subarea in which the difference between the median value of the values in the upper array segment and the median value of the values in the lower array segment is greater than the second predetermined constant value.

18. The method as claimed in claim 17 wherein the interlocking subareas are substantially in the shape of a cross.

19. The method as claimed in claim 17 wherein substantially all of the interlocking subareas contain twelve picture elements.

20. The method as claimed in claim 17 wherein the interlocking subareas are substantially in the shape of a cross and wherein substantially all of the interlocking subareas contain twelve picture elements.

21. The method as claimed in claim 17 further comprising the step of modifying one or more of the digital values coded for the picture elements contained within one or more of the interlocking subareas, wherein the value of a particular modified digital value for a picture element contained within a particular interlocking subarea is dependent upon the coded digital values of the picture elements within one or more of the interlocking subareas in proximity to the particular interlocking subarea.

22. The method as claimed in claim 17 wherein the modified digital values coded for the picture elements contained within one or more of the interlocking subareas are equal to the sum of two times the assigned value of the picture element plus the values of two picture elements within one or more of the interlocking subareas in proximity to the particular interlocking subarea, divided by four.

* * * * *